Figure 1:
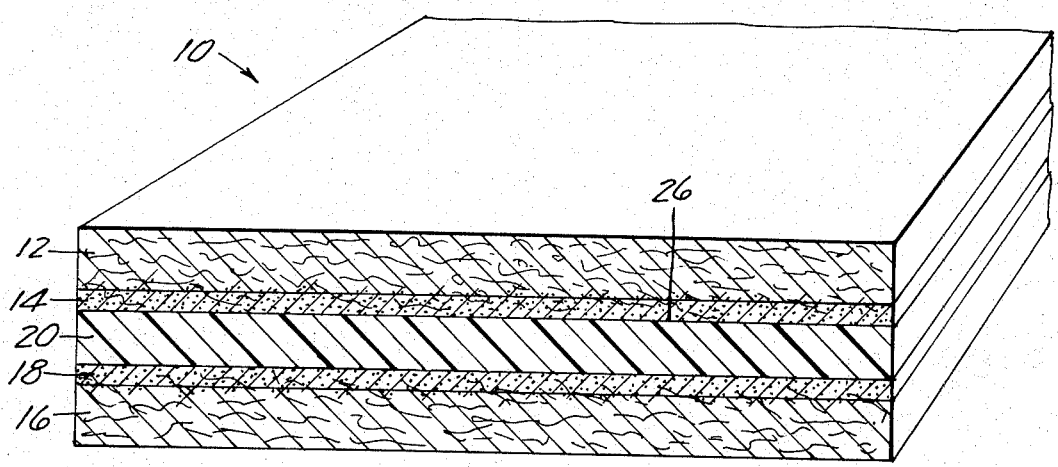

United States Patent [19]
Hansen

[11] 3,809,077
[45] May 7, 1974

[54] SURGICAL DRAPE

[75] Inventor: Paul E. Hansen, Village of Lake Elmo, Minn.

[73] Assignee: Minnesota Mining and Manufacturing Company, St. Paul, Minn.

[22] Filed: May 11, 1972

[21] Appl. No.: 252,368

Related U.S. Application Data
[63] Continuation-in-part of Ser. No. 7,109, Jan. 30, 1970, abandoned.

[52] U.S. Cl. .............................. 128/132 D, 161/160
[51] Int. Cl. ............................................. A61f 13/00
[58] Field of Search ....... 128/132 D, 292, 187, 296, 128/290; 161/160

[56] References Cited
UNITED STATES PATENTS

| | | | |
|---|---|---|---|
| 2,657,157 | 10/1953 | Francis | 161/160 |
| 2,875,115 | 2/1959 | Lott et al. | 161/160 |
| 2,896,627 | 7/1959 | Harwood | 128/290 R |
| 2,897,108 | 7/1959 | Harwood | 128/296 |
| 3,310,459 | 3/1967 | Guthrie | 128/292 |
| 3,431,911 | 3/1969 | Meisel | 161/160 |
| 3,455,302 | 7/1969 | Liloia et al. | 128/132 D |
| 3,485,705 | 12/1969 | Harman | 128/290 W |

Primary Examiner—Charles F. Rosenbaum
Attorney, Agent, or Firm—Alexander, Sell, Steldt & Delahunt

[57] ABSTRACT

A surgical drape is constructed of two layers of thin, absorbent, compacted web of randomly interlaced, staple textile fibers having disposed therebetween a thin drapable, impervious sheet of a thermoplastic film which is adherently bonded to the absorbent sheet across the contacting surfaces thereof by means of a soft latex adhesive. The bonding is such that the absorbent sheet and film are not readily separable at any point across the contacting surfaces which results in a surgical drape having substantially improved strength, wet strength, and abrasion-resistance.

6 Claims, 2 Drawing Figures

PATENTED MAY 7 1974 3,809,077

INVENTOR.
PAUL E. HANSEN
BY Kinney, Alexander,
Sell, Steldt & De La Hunt
ATTORNEYS

SURGICAL DRAPE

BACKGROUND OF THE INVENTION

This application is a continuation-in-part of applicant's co-pending application Ser. No. 7,109, now abandoned The present invention relates to absorbent disposable drapes and more particularly, to absorbent disposable drapes which are impermeable to the passage of micro-organisms and fluids and which exhibit excellent abrasion resistance and wet strength qualities.

The purpose of the surgical drape is to place a bacteria-proof barrier between the aseptic operative field and areas which are incapable of surgical cleansing. The drape also provides the physician, while working on the patient, a sterile area on which to lay surgical instruments and the like. The drape should be sufficiently flexible or drapable so that it may somewhat conform to the contour of the body which it is covering, and so that it may hang down over the edges of the operating table without interfering with the physician's work. The drape should be absorbent so that it may collect exudate from the operative site and should also provide enough friction so that the drape does not slide off the patient during the operation. Further, the drape should not cause heat buildup on the skin surface of a patient. Linen, in a varying number of layers, has been used extensively but has not been as satisfactory as desired. Multiple layers are expensive, both in their original cost and in their laundering, folding, sterilizing and storage. Multiple layers of linen have been used under the theory that increasing the thickness would slow up the progress of bacteria. Actually, the absorbent quality of the linen layer upon layer is so great that bacteria passes with almost instantaneous rapidity through a large number of layers even when a minimum of moisture is applied.

Various attempts have been made to provide a surgical drape that is both absorbent but yet impermeable to the passage of fluids and micro-organisms therethrough as exemplified in U.S. Pat. Nos. 3,455,302 and 3,423,277. These drapes comprise generally two sheets of an absorbent facial tissue paper of wood pulp forming outside layers and having sandwiched therebetween a thin layer of plastic film, the thin layers being bonded peripherally to hold them together. Although the above-mentioned surgical drapes are absorbent and impermeable where unbonded, the durability and integrity of the drape is less than desirable. The unattached absorbent layer is easily abraded as it is not bound to the thermoplastic film except around the peripheral areas. Abrasion not only destroys the absorbency of portions of the drape, but also releases bits of paper and short lint fibers which may enter the operative site, causing complications. Further, the prior art drapes, in order to retain drapability and flexibility, have an integrity and tensile strength such that the drape may be relatively easily torn, abraded or ruptured.

There are also drapes used presently which comprise a plastic film interposed between two absorbent sheets and are intermittently heat sealed together, which is referred to as a "checked drape" because of the checked appearance of the heat seals. This drape, however, has minimal wet strength as the tissue surfacing is easily delaminated from the plastic film, and, in addition, the heat sealing to the plastic film may result in the formation of tiny pin holes in the film which diminishes the impermeability of the drape.

SUMMARY OF THE INVENTION

According to the present invention a flexible, drapable, absorbent, impervious disposable surgical drape is provided which has improved integrity, durability, wet strength, and resistance to abrasion. The drape is absorbent but yet impermeable to the passage of fluids and micro-organisms and comprises, generally, a first thin, absorbent, compacted, web of randomly interlaced, staple textile fibers; a second thin, absorbent, compacted web of randomly interlaced staple, textile fibers; and a thin drapable, impervious sheet of a thermoplastic film disposed between the first and second absorbent web sheets and adherently bonded thereto at the contacting surfaces with a soft latex adhesive, said adhesive also serving to unify said web, the bonding being such that the absorbent web sheets and film are not readily separable at any point across the contacting surfaces thereof, thereby imparting substantially improved wet strength, integrity, durability, and abrasion-resistance to the drape. For many uses, a two layer structure of absorbent web and thermoplastic film can be used.

Figure 2:
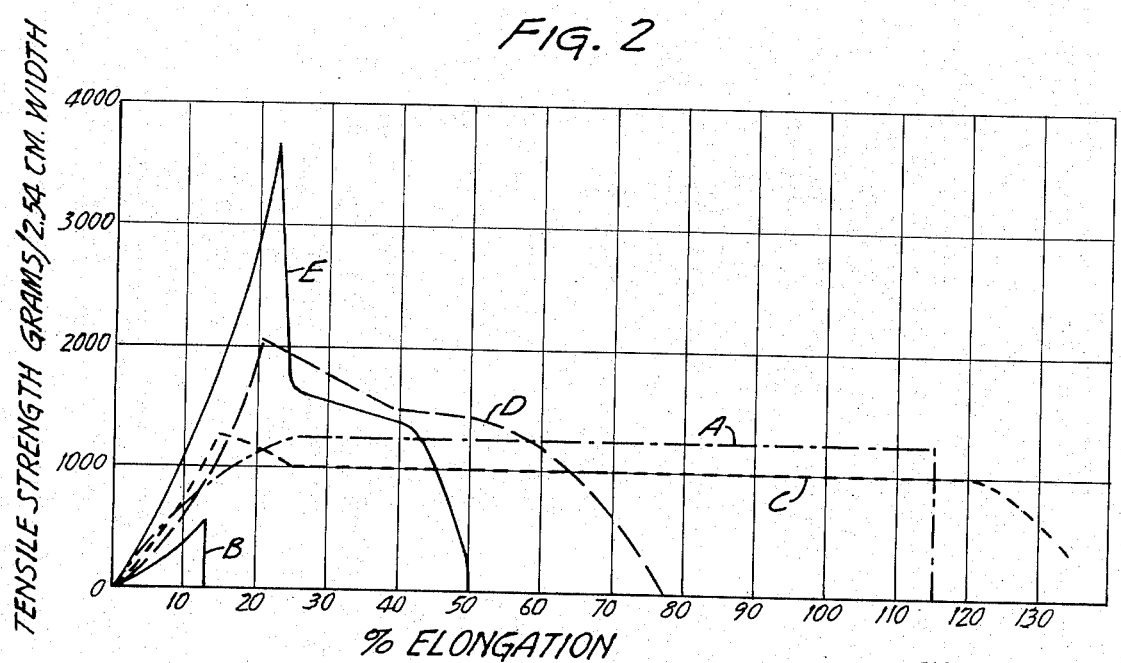

The present invention will be more fully understood with reference to the following drawings wherein:

FIG. 1 is a cross section of the disposable surgical drape of the present invention; and FIG. 2 is a graph illustrating the tensile strength of the drape of the invention compared with the components thereof and other drapes.

Referring to the drawings, the surgical drape illustrated in FIG. 1 comprises generally, a first layer 12 of an absorbent, thin, compacted web of randomly interlaced staple, textile fibers which is randomly overlying and adherently bonded to a thin drapable thermoplastic film 20 on one side. Similarly, a similar second fibrous web sheet 16 is bonded to the other side of film 20. The absorbent sheets are bonded to the film by means of a soft latex adhesive 14 and 18, both absorbent layers being bonded along the entire contacting surface between the absorbent layers and the film.

The surgical drape of this invention can be made by saturating an absorbent, thin, nonwoven web of staple fibers generally having a length from about three-fourth inch to 2½ inches and formed on one of several nonwoven machines known in the art. The web is saturated with a latex binder solution, which may contain pigments to provide a surgical drape having a pleasing appearance. While still wet, the saturated web is laid on the top side of a suitable thermoplastic film. The two part laminate is then placed film side down on a supporting mesh carrier which carries the laminate through a warm air drying oven, the solvent for the binder solution being selected to have a good volatility sufficiently below the melting point of the film to prevent any film damage during solvent removal. The temperature of the warm air oven can be varied depending on the properties of the web, latex, and thermoplastic film; however, the temperature must be low enough to produce any significant formation of small holes or pores in the thermoplastic material which would make the surgical drape unduly permeable to micro-organisms and yet high enough to evaporate the solvent from the binder and cure the binder.

Latex solution from the saturated web wicks to the web-film interface before curing thereby maximizing the bond between the web and the film. After the water or other solvents present in the latex binder solution are evaporated, the binder cures, bonding the absorbent web firmly to the thermoplastic film and sufficient latex binder remains in the web to bond the nonwoven fibers at their points of contact forming an absorbent web which has good abrasion resistance properties while still being soft, drapable and possessing good liquid absorption.

The surgical drape absorbent on one side can be used as is for many purposes such as a table or Mayo stand cover. For surgical drapes with an absorbent layer on both sides the laminating process can be repeated resulting in a surgical drape with absorbent webs on both sides.

The bonding of the fiberous web intimately with the thermoplastic film, as illustrated, gives the surgical drape the improved properties heretofore described. Fibers adhered to the film, being intimately held by the adhesive, are not readily separable therefrom and the absence of high heat bonding prevents the formation of pin holes in the thermoplastic sheet or melting of the thermoplastic sheet allowing fibers to penetrate the thermoplastic destroying its integrity, thus, strongly adhering the webs 12 and 16 to the thermoplastic film 20. Where the absorbent material is merely heat sealed to the film, as in the prior art surgical drapes in an attempt to fabricate a drape retaining the properties of impermeability and drapability, there is minimal mechanical holding between the fibers and the film, and thus, are easily separable.

In the formation of the web any suitable fiber or fiber blend may be used, e.g. viscose rayon or blends thereof with nylon, polyester, cotton, hemp, or other suitable natural or synthetic fibers. The fiber length is important to provide drapability, cloth-like feel and handling, and an absence of linting in the final product.

As for the thermoplastic film, any thin, readily conformable polymer, e.g. olefinic, vinyl, polyester, or other suitable polymer or blend may be used. A preferable film is that of polyethylene having having the surface thereof treated to be more adhesive receptive or hydrophilic, as by solvent, flame, electrical discharge, or other treatment known to the art.

The latex may be of any suitable polymer which forms a water-resistant coating on the web fibers and which adheres the web to the thermoplastic film. A preferred group of latices is that utilizing acrylate polymers, e.g. copolymers of acrylic acid and its esters.

All of the components should, of course, be selected to minimize any irritation to the human skin.

The unitary construction of the above-described surgical drape offers many advantages. The construction provides a material having a high degree of wet strength and integrity without sacrificing drapability. Further, when the absorbent material is only loosely bonded to the thermoplastic film or intermittently bonded along its surface, minor abrasion to the absorbent web will cause it to lint and often delaminate somewhat allowing fibers in the web to become dislodged from the drape and which may thereafter enter the surgical site. On the other hand, adherence along the entire contacting surface area dramatically reduces linting and improves abrasion resistance and greatly reduces the chances of any fibers becoming dislodged.

Further, while it was thought that the use of an impermeable thermoplastic film in a drape would cause heat buildup on the skin of a patient, the drape of the present invention surprisingly resulted in no noticeable heat buildup on the skin surface.

Improved integrity, durability, and abrasion resistance which the present drape has when compared to intermittent or peripherally bonded, absorbent impermeable drapes presently being used, is due to what is considered to be a synergistic effect between the components of the surgical drape of the present invention when bonded together as heretofore described although applicant does not intend to be bound by such theory. In other words, an absorbent impermeable surgical drape having the components of an absorbent nonwoven web and a thin thermoplastic film disposed between the two webs and randomly adhesively bonded thereto exhibits greater wet strength and integrity than the sum of the same properties for the component parts. This is best illustrated by referring to the graph of FIG. 2. The graph shows the result of an "Instron" test which is a test for the tensile strength of a given material. To test the tensile strength of the material, which in this case was a 1 mil (0.00254 cm) polyethylene film (A), a wet viscose rayon fiber mat (B), a drape having two layers of paper intermittently heat sealed to a polyethylene film (checked drape) (C), the drape of the present invention having the nonwoven web bonded to only one side of the polyethylene film (D), and the drape of the present invention wherein both sides of the drape were bonded as heretofore described (E).

The test is run by taking a 1 in. (2.54 cm) by 6 in. (15.24 cm) sample of the test material and placing one portion of the material in the jaws of an Instron testing machine and clamping it therein. The lower portion of the sample is similarly clamped into the lower jaws, wherein there is a 4 in. (10.16 cm) distance between the jaws. The material is stretched between the jaws at a rate of 12 in. (30.48 cm) per minute (cross head speed) until failure of the material occurs. The amount of force needed to break the material (ordinate) and elongation of the material at its breaking point (abscissa) are recorded directly on an "Instron" recording chart. The samples were tested wet because the wet strength of the drape is considered to be one of its unique properties. The samples were immersed in tap water at room temperature for 60 seconds before they were placed in the jaws of the Instron testing machine. The results of the test are illustrated in the graph. The polyethylene film (A) failed at about 115 percent elongation at a force of 1270 gm. per inch (2.54 cm). The viscose rayon web (B) failed at about 12.5 percent elongation at a force of 590 gm. per inch (2.54 cm). The drape having only one side bonded according to the present invention (D) failed at an elongation of 20.4 percent elongation at a force of 2040 gm. per inch (2.54 cm). There is apparently a slight synergistic effect even where only one layer of fibrous web is bonded to the film. Where both sheets of nonwoven web were adherently bonded to the polyethylene film (E) the drape did not fail until about 22.5 percent elongation at 3630 gm/cm. per inch (2.54 cm) applied force. The failure of the drape products illustrated as D and E is defined as the point at which the nonwoven web actually ruptures and delaminates at a certain point, although the unbroken polyethylene film continues to stretch after the web ruptures. Thus, the drape of the present invention (E) exhibited a wet tensile strength greater than the sum of the tensile strengths of the components (A and B). The drape having paper intermittently heat sealed to polyethylene film (C) exhibited a tensile strength substantially lower than that of the drape of the present invention or nearly the same as that of the polyethylene film alone.

The film 20 should be formed of a material that has substantially no rigidity in the thickness of the film used and which in itself drapes readily over any objects over which it may be placed. Accordingly, very thin film should be used. On the other hand, the film should have sufficient strength to avoid rupture or tearing during use and should be free of pin holes and the like through which moisture can seep resulting in the passing of micro-organisms through the drape. Polyethylene films, for example, have been found to make excellent fluid and organism impermeable barriers for the drapes of the present invention, particularly where used in film thicknesses of about 0.5 mil (0.0013 cm) to 2 mil (0.0051 cm). Examples of other materials that may be used are ethylene vinyl acetate copolymer and polyvinyl chloride film. It is important that the film is corona treated, a well known procedure, to activate or prime the film surface os that the surface is bondable and will more readily accept the adhesive.

The absorbent sheets 12 and 16, comprising a compacted, tissue-like web of randomly interlaced staple fibers, are well known in the art and are formed by passing crude fibers through a textile carding machine, such as a "Rando-Webber" available from Curlator Corp. The resulting web consists of a nonwoven, compacted web formed of interlaced staple textile fibers which is unified with a resin and has a fibrous surface which appears continuous to the naked eye. This unified nonwoven reticular fibrous backing has a very large number of minute interfilar passageways per square inch (or square centimeter) and is highly porous. The fabric material is absorbent, durable, non-toxic, non-odorous and very drapable. The use of textile fibers which are substantially longer than ordinary wood pulp fibers helps the web resist abrasion and linting when consolidated with the latex binder. The nonwoven webs have been found to have substantially greater dry and wet strength than has creped facial quality papers presently used in the fabrication of drapes. Preferably, viscose rayon fibers are used in the fabrication of the absorbent material although other fibrous materials, such as cellulose acetate, are satisfactory for most applications.

The adhesive used to bond the absorbent sheets to the thermoplastic film is a soft, sterilizable, non-odorous, nontoxic, chemical, alcohol and water resistant latex adhesive. Preferably, an acrylic latex adhesive is used as it meets the above requirements quite well and does not diminish the drapability of the drape. Another adhesive that has been found suitable for purposes of the present invention is a plasticized vinyl acetate. Preferably, about 1 part adhesive is used per 2 parts web.

The adhesive which is used to bond the nonwoven webs to the polyethylene film can contain ingredients to reduce the incidence of a static discharge in the operating room, which is a hazard in the presence of explosive gases, such as ether. Chese ingredients, which render the drape surface more electrostatically conductive, prevent the accumulation of such charges.

Various other ingredients may be added to the adhesive to improve the properties of the drape. For example, alkylaryl polyether alcohol, a wetting agent, may be added to aid in the absorption of fluids by the drape. This is in contrast to some paper drapes which are water proofed to avoid the passage of fluids through the drape in an attempt to prevent the passage of micro-organisms.

The nature of the materials used to prepare the fabric drape permits easy converting into various sizes and shapes which are specifically suited for certain kinds of surgical procedures. Apertures can be inserted and the material folded, sterilized, and packaged readily and conveniently. The drape may be used as a surgical drape, Mayo stand cover, laparotomy packs, obstetric packs and for any other applications wherein an absorbent impermeable drape would be desirable.

In another embodiment of the present invention, for certain applications where two absorbent surfaces are not needed (i.e. Mayo Stand cover) the drape need only have one absorbent surface. Where this drape is employed, a thicker film is used to insure that the drape will not be punctured by the surgical instruments.

The invention will be further understood by reference to the following illustrative, but non-limiting examples in which all parts are by weight unless otherwise noted.

EXAMPLE 1

A disposable surgical drape was prepared according to the present invention using rayon nonwoven webs as the absorbent sheets and polyethylene film as the central impermeable portion.

The fiber webs were prepared on a carding machine commercially available as the Davis & Furber wool sample carding machine. The purpose of the machine is to break up clumps of the raw fiber and to uniformly lay out the fibers as nonwoven webs. An 8 gram fiber feed of 1½ denier viscose rayon was used to obtain a finished web weight of 7 pounds per ream (320 sq. yd.). The fiber was opened by hand and distributed on the feed apron of the machine. The fibers were then run through the machine and the web collected on a winder drum. The resulting web was cut from the drum and folded in half. After rotating the web 90°, it was cut to a width of 8½ inches across the fiber direction. These "blocks" of fiber were then placed continuously on the feed apron and carded a second time, with the 90° rotation heretofore mentioned. The finished web contained 3 layers of fiber. The final web product, sandwiched between sheets of No. 30 basis weight paper, were cut to 7 by 18 inches on a paper cutter.

An acrylic latex rubber adhesive was applied to the webs. The adhesive contained the following ingredients:

| | |
|---|---|
| Oxalic acid | 600 gms. |
| Anionic emulsion containing 10% dimethyl silane carbonyl fluid, available as "Anti-foam B" from Dow-Corning Co. | 300 gms. |
| Mixture of 60% Dioctoyl sodium sulfosuccinate and 20% Iso-propyl alcohol available as "Triton GR-5" from Rohm & Haas Co. | 400 gms. |
| Alkylaryl polyether alcohol | 400 gms. |
| Aqueous copper phthalocyaninein finely subdivided form dispersed with a small amount of an anionic dispersing agent available as "Fast Blue RDC Paste" from E. I. Du Pont Chemical Co. | 390 gms. |
| Aqueous dispersion of toned carbon black available as "Jet Black Pigment" from Hercules Chem. Corp. | 150 gms. |
| Acrylic ester copolymers of methyl and ethyl | | acrylate with an amine type reactive agent available as "Rhoplex HA-8" from Rohm & Haas Co. — 70.5 kg. (155 lbs.)

Acrylic ester copolymers of methyl and ethyl acrylate with a nonreactive amine agent available as "Rhoplex B-85" from Rohm & Haas Co. — 12.3 kg. (27 lbs.)

Ethoxylated fatty ester, an anti-static agent available as "Cirrasol 6M-5074" from International Chemical Industries — 1.2 kg.

Water — 232.7 kg. (512 lbs.)

The water and oxalic acid were added to a large container and mixed at 25° C. for 15 minutes. The remaining ingredients were added and the mixture was stirred at 25° C. for 15 minutes.

The aforementioned web sandwiches were treated with the resin latex adhesive as follows: The webs were held between loosely-woven glass cloth scrims and gently immersed in a shallow tray containing about 2 liters of the above adhesive dispersion. After being thoroughly saturated, the web and scrims were carefully lifted out of the fluid on a piece of expanded metal screen, previously placed in the bottom of the pan. The web and scrim sandwich was then passed through a pair of rubber-covered squeeze rolls adjusted to press out surplus fluid. The scrim was peeled away from one side of the web and the web was then laid on the surface of a piece of corona-discharge treated polyethylene film of 0.00254 cm. in caliper. The remaining scrim was pressed with a roller or rubbed with a finger to incure good wetting of and intimate contact with the film by the saturated fibrous web. The second scrim was then peeled away and the product dried.

Drying was accomplished by hanging the drape in a laboratory circulating hot-air oven at 100–110° C. for 5 minutes. An absorbent layer was bonded to the other side of the polyethylene film in the same manner.

The drape prepared as above was tested for abrasion resistance by a well known procedure. A 4 inch circular disc of drape material was placed on an adhesive coated card stock mounting disc and the assembly clamped to a "Tabor Abraser" platform, the machine being available from Tabor Instrument Co. The adhesive and clamp are used to anchor the entire surface of the test sample securely to the platform.

The surface of the test sample was uniformly wetted with 10 drops of water from an eye dropper. Two standard neoprene wheels were placed on the surface of the test sample. Counter weights were used to bring the total force exerted on the test sample by the abrasion wheels to 150 gms. per wheel.

The Taber Abraser was started which revolves the platform at 70 rpm and the total number revolutions (cycles) to reach a 90 percent clear visual pathway (expose polyethylene film) under the abrasion wheels was recorded. During the procedure, one drop of water was placed at random on the drape surface about every 15 seconds to prevent drying.

The following results illustrate the improved abrasion resistance of the drape of the present invention when compared to a drape laminate having its layers intermittently heat sealed or "checked." The drapes were tested on each side and in the middle.

TABLE 1

| Bonded Drape | Cycles (first side) left | center | right | Cycles (second side) left | center | right |
|---|---|---|---|---|---|---|
| 1 | 128 | 247 | 280 | 420 | 260 | 106 |
| 2 | 233 | 250 | 466 | 393 | 228 | 307 |
| 3 | 567 | 249 | 419 | 484 | 356 | 322 |
| 4 | 41 | 266 | 423 | 332 | 360 | 349 |
| 5 | 416 | 380 | 598 | 792 | 283 | 675 |
| 6 | 265 | 212 | 340 | 642 | 415 | 658 |
| 7 | 292 | 299 | 511 | 399 | 287 | 529 |
| 8 | 280 | 187 | 192 | 265 | 487 | 351 |
| | Average 272 | | | Average 410 | | |

| Check Drape | Cycles (first side) | Cyles (second side) |
|---|---|---|
| 1 | 7 | 6 |
| 2 | 4 | 10 |
| 3 | 3 | 3 |

The tensile strength and elongation of the drape of the invention was determined on an "Instron" machine according to the procedure as heretofore described.

TABLE 2

| Bonded Drape | Tensile in Kg. Left | Center | Right | % Elongation Left | Center | Right |
|---|---|---|---|---|---|---|
| 1 | 4.0 | 3.72 | 3.54 | 21.2 | 22.5 | 18.7 |
| 2 | 3.77 | 3.31 | 3.81 | 22.7 | 20.0 | 19.9 |
| 3 | 3.9 | 3.68 | 3.95 | 31.7 | 23.0 | 20.0 |
| 4 | 4.0 | 3.54 | 3.9 | 18.2 | 18.7 | 20.0 |
| 5 | 3.32 | 3.4 | 4.0 | 21.5 | 20.5 | 21.2 |
| 6 | 3.77 | 3.18 | 3.32 | 18.6 | 18.7 | 18.7 |
| 7 | 3.63 | 3.45 | 3.68 | | 20.0 | 21.2 |
| 8 | 3.4 | 3.54 | 3.5 | 20.0 | 22.0 | 19.5 |
| | Average 3.68 kg. | | | | | |

| Check Drape | Tensile in kgs. | % Elongation |
|---|---|---|
| 1 | .95 | 16.9 |
| 2 | 1.135 | 19.0 |
| 3 | 1.24 | 18.3 |

The tests set out above serve to illustrate the dramatically improved integrity, durability and wet strength of the bonded drape of the present invention.

EXAMPLE 2

A carded nonwoven web 96 inches wide and weighing 8 pounds per ream (320 square yards) was produced using the procedure of Example 1 from 1½ denier, 1-9/16 inch long viscose rayon fiber. The resulting web was saturated with a latex binder solution having the composition of Example 1 except 170 kg. (375 pounds) of water was used instead of 233 kg. water. The web was saturated by passing the web between two rolls. The top roll was a medium soft silicone covered roll and the bottom roll was a knurled steel roll partially immersed in the latex binder solution and wiped with a doctor blade.

After passing between the rolls the saturated web was laid upon the top side of a 0.00254 cm thick, corona discharge treated blue polyethylene film being unwound from a master roll. The resulting wet laminate was placed on a warm horizontal metal mesh endless carrier belt and onveyed into a warm air horizontal drying oven heated to 180° F.

The hot air evaporated the water and cured the latex binder, which had concentrated at the web-film interface, consliditating the laminate into a non-linting surgical drape which was wound into rolls. The resulting drape could be used as produced or another layer of absorbent web could be bonded to the other side of the polyethylene using the procedure outlined above.

What is claimed is:

1. A disposable, impermeable, absorbent surgical drape conformable to the human body, comprising: a thin drapable, impervious sheet of a thermoplastic film; and
at least one layer of an absorbent, thin, compacted, nonwoven web of randomly interlaced staple fibers said fibers being bonded to each other and to said film at the contacting surfaces thereof with a soft latex adhesive substantially throughout the contacting surfaces thereof whereby said absorbent sheet and said film are not readily separable at any point across said surfaces, the adhesive also imparting abrasion resistance, wet strength and tensile strength to said drape throughout the surface thereof.

2. A disposable impermeable absorbent surgical drape conformable to the human body, comprising:
top and bottom layers of thin, absorbent, compacted, nonwoven webs of randomly interlaced, staple fibers of a length from about three-quarter inch to 2½ inch,
a thin drapable intermediate layer of an impervious sheet of a thermoplastic film disposed between said top and bottom absorbent sheets and a soft, latex adhesive randomly adhesively bonding said top and bottom layers to said intermediate layer thereto throughout surfaces thereof, said adhesive further unifying said web, said bonding being such that said absorbent sheets and said film are not readily separable at any point throughout their contacting surfaces thereby imparting substantially improved abrasion resistance, wet strenth, and tensile strength to said drape.

3. The disposable drape of claim 2 wherein said film is polyethylene.

4. The disposable drape of claim 2 wherein said adhesive is an acrylic latex adhesive.

5. The disposable drape of claim 2 wherein said web is viscose rayon.

6. The disposable drape of claim 2 wherein said web is cellulose acetate.

* * * * *

UNITED STATES PATENT OFFICE
CERTIFICATE OF CORRECTION

Patent No. 3,809,077    Dated July 25, 1974

Inventor(s)  Paul E. Hansen

It is certified that error appears in the above-identified patent and that said Letters Patent are hereby corrected as shown below:

In abstract, line 4, should read "impervious" instead of "imprevious".

Col. 1, line 5 should read "7,019" instead of "7,109".

Col. 3, line 43 please delete second "having".

Col. 4, line 59 should read "sheets" instead of "sbeets".

Col. 5, line 25 should read "so" instead of "os".

Col. 5, line 65 should read "these" instead of "chese".

Col. 8, Table 1, line 4 should read:

4    411  266    423    332    360    349.

Page 1, item [63] "7,109" should read -- 7,019 --.

Signed and sealed this 22nd day of October 1974.

(SEAL)
Attest:

McCOY M. GIBSON JR.
Attesting Officer

C. MARSHALL DANN
Commissioner of Patents